United States Patent [19]

Haas

[11] Patent Number: 5,158,803
[45] Date of Patent: Oct. 27, 1992

[54] EMERGENCY FLAT ROOF REPAIR METHOD

[76] Inventor: William Haas, 248 Hidden Lake Rd., Higganum, Conn. 06441

[21] Appl. No.: 716,240

[22] Filed: Jun. 17, 1991

[51] Int. Cl.⁵ .............................................. B32B 35/00
[52] U.S. Cl. ................................ 427/140; 52/169.14; 52/514; 106/33; 427/188
[58] Field of Search ............... 427/140, 180, 186, 188; 52/169.14, 514; 106/33; 428/911

[56] References Cited

U.S. PATENT DOCUMENTS

| | | | |
|---|---|---|---|
| 2,277,286 | 3/1942 | Bechtner | 52/169.14 |
| 4,209,568 | 6/1980 | Clem | 52/169.14 |
| 4,534,926 | 8/1985 | Harriett | 106/33 |
| 4,581,864 | 4/1986 | Shvakhman et al. | 52/169.14 |
| 4,997,701 | 3/1991 | Clem | 106/33 |

FOREIGN PATENT DOCUMENTS

WO87/03225  6/1987  PCT Int'l Appl. ............... 427/186

*Primary Examiner*—Shrive Beck
*Assistant Examiner*—Terry J. Owens
*Attorney, Agent, or Firm*—CTC & Associates

[57] ABSTRACT

An emergency flat roof repair method and material which can be used during rain storms in standing water which involves the spreading of a sealer composed of sodium bentonite particles over the leak by hand or spreader. On contact with water the sealer expands and gravitates to the leak almost instantly plugging the same.

3 Claims, No Drawings

EMERGENCY FLAT ROOF REPAIR METHOD

BACKGROUND OF THE INVENTION

Flat roofs have long been problemsome because of leaks. Many improvements have been developed such as built up roofs, IRMA or inverted roofs where the waterproof membrane is located beneath the insulation layer, continuous membrane roofs and the like, but on occasion leaks do occur. Such leaks can and generally occur at the most inopportune time and location. As is well known, leaking water rarely travels in a straight line, rather it follows beams or girders to a different location; often causing expensive damage to equipment and/or decor. Until now roof repairs must await the cessation of the rain when the roof once again is dry. The instant invention permits the blockage of the leak during the rain reducing or eliminating damage being caused by the leak.

OBJECT OF THE INVENTION

It is an important of the invention to block leaks into the interior of buildings with flat roofs.

It is another important object of the invention to seal leaks into a building with flat or modestly pitched roofs during a rain storm.

It is yet another object of the invention to rapidly stop leaks into buildings with a flat roofs during a rainstorm.

It is yet another object of the invention to stop leaks into buildings with flat roofs during a rainstorm which will not interfere with the application of a permanent patch when the rainstorm ends and the roof is dry.

It is yet another object of the invention to be able to easily apply the sealant material without special equipment in a simple manner over a large area of the flat roof to block leaks which are not specifically located.

It is yet another object of the invention to apply leak sealing material into ponded water on flat roofs to prevent leakage.

PRIOR ART

A search of the commercial art revealed no method or use of the material of the instant invention to stop leaks in flat or essentially flat roofs (2-5° pitch) during rainstorms.

DESCRIPTION OF THE INVENTION

Flat roofs (hereinafter roofs) have historically been patched after a rainstorm has abated and the roof dried. The instant invention gives an alternative to building maintenance personnel wherein they may readily stop a leak in progress during a rainstorm by the application of specially dried or dehydrated, formulated and sized particles of sodium montmorillontie also known as western or sodium bentonite (hereinafter sealer) to the wet roof by hand or spreader in thicknesses (dried) of ½ inch (1.27 cm). Sealer instantly absorbs several times its weight of water between the platys in its crystalline structure to swell at least 10-12 and ideally 15 times its original size forming a gel which blocks the leak. The chemical and physical nature of sealer prevents absorption of water in excess of the amount required to swell to its optimum size. The applied ½ inch of sealer gravitates to leaks and almost instantly swells to form a gel several inches (cm) thick essentially forming a barrier to water flow in the leaking area.

Permanent roof repair can easily be accomplished after the roof dries by sweeping up the bulk of now dried sealer and applying conventional organic roof repair products such as tar, caulking and the like. Residual amounts of sealer does not interfere with the adhesion or spread rate of such products.

The preferred form of sealer is in particles of sizes less than 0.0787 inch (2 mm) to 0.0069 inch (0.01173 mm) passing through U.S. Bureau of standards 10 mesh screen and remaining on a 100 mesh screen. Expanding particles of larger size do not flow or gravitate into the leak. Particles of smaller sizes tend to agglomerate tending not to flow into cracks and leaks and uniformly expand to seal a leak.

Particle size is not the only means to obtain optimum expansion of sealer. The adsorption of as little as 100 parts per million but preferably 150 to 200 parts per million by weight of hydrophillic wetting agents or surfactants onto the surface of sealer particle enhances wetting of the particle and the absorption of water into the particle and thus rate and volume of swelling. Such products are well known and include but are not limited to benzene alkyl sulfonates; linear alkyl sulfonates; fatty alcohol sulfonates; ethylene oxide adducts of fatty alcohols, glycols, glycerol and sorbitol, alkylaryl polyether alcohols and the like. Optimum selection of surfactants is determined by dissolving 1% by weight or less of the surfactant in water. Surface tension of such solutions are preferred because cationic centimeter. Nonionic surfactants are preferred because cationic or anionic surfactants may be ionically attracted to sealer, plating out and interfering with the absorption of water, flow into crevices or cracks and subsequent expansion to block the leak.

In addition to improved wetting such surfactants are also useful in assisting the flow of sealer's swelling particles into the cracks and crevices in the roof through which water is leaking. In addition to additives and particles size the chemical composition and moisture content of sealer is important to develop the required 10-12 and ideally 15 times volume swell. Sealer's chemical composition should have a sodium oxide content of over 2.1%, calcium oxide content of less than 0.5%. Magnesium oxide content of less than 1.75%, ferric oxide content of less than 5% and titanium dioxide content of less than 1%. Typical chemical composition by weight of sealer of the instant invention are:

| | |
|---|---|
| silicon dioxide (silica) | 60.34 |
| aluminum oxide (alumina) | 19.35 |
| ferric oxide | 3.48 |
| titanium dioxide | 0.2 |
| calcium oxide (lime) | 0.38 |
| sodium oxide | 2.34 |
| magnesium oxide | 1.67 |
| potassium oxide | 0.1 |
| water | 7.8 |
| other (lost during firing for wet analysis) | 4.34 |
| | 100.00% |

In sealer, sodium oxide content of less than 2.1% results in reduced swell or expansion and gel formation. Likewise, potassium oxide content in excess of 0.1%, calcium oxide in excess of 0.5%, magnesium oxide in excess of 1.75% and titanium dioxide content in excess of 1% will interfere with swell rate and gel structure. Iron oxide in excess of 5% does not appear to interfere with swell rate and gel structure, however, it does result in discoloration of sealer.

Sealer as mined must be processed to attain its required characteristics. Typically such processing includes field air drying during which bulk sealer is turned over repeatedly with graders, bulldozers and the like to expose new surfaces for better air drying. When sealer has dried to a moisture content of approximately 15% by weight, it is ground in, for example, a hammer mill to reduce particle size. Thus ground sealer is rotary kiln dried both reducing moisture content and particle size. Thereafter particles of varying sizes are separated using U. S. Bureau of Standards screens through which the particles are allowed to pass when the moisture content has been reduced to less than 10%. Typically, a number of different particle sizes are collected for different uses. These sizes are plus four screen (30 4), minus four screen plus 10 screen (−4+10), minus 10 screen plus 100 screen (31 10+100), minus 100 screen plus 200 screen (−100+200) and minus 200 screen (−200). It being understood that plus designates the particles that cannot pass through a given screen size and minus designates the particles that pass through a given screen size.

Surfactant may be conveniently added by tumbling sealer with liquid concentrates of the same prior to and as part of the final packaging step. All available sealer screened/sized particles, i.e. plus four; minus four, plus 10; minus 10, plus 60; minus 10, plus 100; minus 60 plus 100; minus 100, plus 200 and minus 200 were evaluated as emergency roof repair materials both with and without surfactant. Based on hand spreading sealer during rainstorm conditions where flow, sealer swell, gel formation and flow of the same to a crack or leak in a flat roof, sealer agglomeration and rate of blockage of a leak were observed, ONLY the preferred particle size of minus 10, plus 100 acted in the manner required to effect a method for emergency roof repair product.

It will be appreciated that the invention well attains the stated objects and advantages among others.

The disclosed details are exemplary and are not to be taken as limitations on the invention except as those details are included in the appended claims.

What is claimed is:

1. A method for sealing flat roof water leaks into a building during a rainstorm, said roof having accumulated standing water from said rainstorm, comprising spreading dehydrated sodium bentonite particles onto said accumulated water on said roof, said particles mixing with said accumulated water on said roof, said mixture gravitating to and into said water leaks, said particles swelling to 10 to 12 times their original size to form a gel, and said gel sealing said water leaks into said building.

2. The method of claim 1 wherein said particles before said spreading have a moisture content of less than 10% by weight; a particle size range of no larger than 0.0787 inch (2 mm) and not less than 0.0069 inch (0.073 mm); a sodium oxide content of no less than 21% by weight; a calcium oxide content of less than 0.05% by weight; a magnesium oxide content of less than 1.75% by weight; a ferric oxide content of no more than 5% by weight and a titanium oxide content of less than 1% by weight.

3. The method of claim 1 wherein said particles before said spreading have surfactants absorbed onto the surfaces of said particles to enhance wetting of said surfaces with liquid water to increase the rate of swelling of said particles; said surfactants being selected from the group consisting of benzene alkyl sulfonites, linear alkyl sulfonates, fatty alcohol sulfonates and ethylene oxide adducts of fatter alcohols, glycerol, sorbitol, and alkylaryl polyether alcohols, which reduce the surface tension of water at 1% or less concentration by weight of surfactant in water to 35 dynes or less per centimeter.

* * * * *